INVENTOR.
BARTON A. PROCTOR
BY
Moses, Nolte, Crews & Berry
ATTORNEYS

IMPROVED DRIVE FOR SOUND RECORDING AND REPRODUCING APPARATUS

Filed Nov. 7, 1960 8 Sheets-Sheet 2

INVENTOR.
BARTON A. PROCTOR
BY
Mosee, Nolte, Crews + Berry
ATTORNEYS

Sept. 3, 1963 B. A. PROCTOR 3,102,699

IMPROVED DRIVE FOR SOUND RECORDING AND REPRODUCING APPARATUS

Filed Nov. 7, 1960 8 Sheets-Sheet 3

INVENTOR.
BARTON A. PROCTOR
BY
Moses, Nolte, Crews & Berry
ATTORNEYS

IMPROVED DRIVE FOR SOUND RECORDING AND REPRODUCING APPARATUS

Filed Nov. 7, 1960 8 Sheets-Sheet 4

INVENTOR.
BARTON A. PROCTOR
BY
Moses, Nolte, Crews & Berry
ATTORNEYS

INVENTOR.
BARTON A. PROCTOR
BY
Moses, Nolte, Crews & Berry
ATTORNEYS

Sept. 3, 1963 B. A. PROCTOR 3,102,699

IMPROVED DRIVE FOR SOUND RECORDING AND REPRODUCING APPARATUS

Filed Nov. 7, 1960 8 Sheets-Sheet 6

INVENTOR.

BARTON A. PROCTOR

BY

Moses, Nolte, Crews & Berry

ATTORNEYS

IMPROVED DRIVE FOR SOUND RECORDING AND REPRODUCING APPARATUS

Filed Nov. 7, 1960 8 Sheets-Sheet 7

INVENTOR.
BARTON A. PROCTOR
BY
Moses, Holte, Crews & Berry
ATTORNEYS

IMPROVED DRIVE FOR SOUND RECORDING AND REPRODUCING APPARATUS

Filed Nov. 7, 1960

INVENTOR.
BARTON A. PROCTOR
BY
Mosse, Holte, Crews + Berry
ATTORNEYS 3,102,699

IMPROVED DRIVE FOR SOUND RECORDING AND REPRODUCING APPARATUS

Barton A. Proctor, Larchmont, N.Y., assignor, by direct and mesne assignments, to Proctor Dictating Machine Corporation, New York, N.Y., a corporation of New York Filed Nov. 7, 1960, Ser. No. 67,860
13 Claims. (Cl. 242—55.14)

The present invention relates to a constant speed drive mechanism and more particularly to drive mechanism of this character which is suitable for use with recording and reproducing devices employing a recording medium in strip form which is wound upon reels.

The present application in a continuation-in-part of applications Serial No. 338,777, filed on February 25, 1953, and Serial No. 421,839, filed on April 8, 1954, since patented; and application Serial No. 460,229, filed on October 4, 1954, all for Sound Recording and Reproducing Apparatus.

In my above-referred to patents, two reels are provided. Either one of the reels may be selectively driven to wind a strip of recording medium thereon, the recording medium being unwound from the other reel which is permitted to rotate subject to the restraint of a light frictional drag.

Using this arrangement of my patents, the driven reel is operated at constant angular velocity and the other reel which is unwinding rotates at an uncontrolled and varying angular velocity which is determined by the linear speed of the recording medium. This linear speed varies continuously and increases progressively as the strip of recording medium accumulates in successive layers upon the driven reel, thus gradually increasing the effective radius of driven reel.

In accordance with the present invention, I provide variable speed drive means for controlling the angular velocity of the driven reel progressively in accordance with the effective radius produced by the accumulated strip of recording medium, feeler means being provided which controls the variable speed drive in accordance with the actual radius of one of the reels as measured continuously by the feeler means and which produces a substantially constant linear speed for the recording medium.

Additionally, in the case of a strip type recording medium which is electrically non-conductive, an electrically conductive portion is provided in proximity to each end of the strip. This conductive portion cooperates with contact members to close a normally open electrical circuit. Closure of this electrical circuit actuates electromagnetic mechanism which causes a reversal of the direction of travel of the recording medium.

Accordingly, it is an object of the invention to provide reel drive mechanism of this character in which the linear speed of the recording medium is maintained effectively constant within a relatively narrow range without the use of a capstan or similar driving means which directly engages the recording medium to produce the constant linear speed.

Another object of the invention is to provide directional control means for reversing the direction of travel of the recording medium, the directional control means being actuated by an electrically conductive area on an electrically non-conductive strip of recording medium, a separate electrically conductive area being provided in proximity to each end of the strip.

Still another object of the invention is to provide an improved type of two-speed clutch for driving the recording medium at high speed for the selection of a particular longitudinal portion of the strip at which a desired recording is located.

Other and further objects, features and advantages of the invention will become apparent upon reading the following specification together with the accompanying drawing forming a part hereof.

Referring to the drawing.

Figure 1:
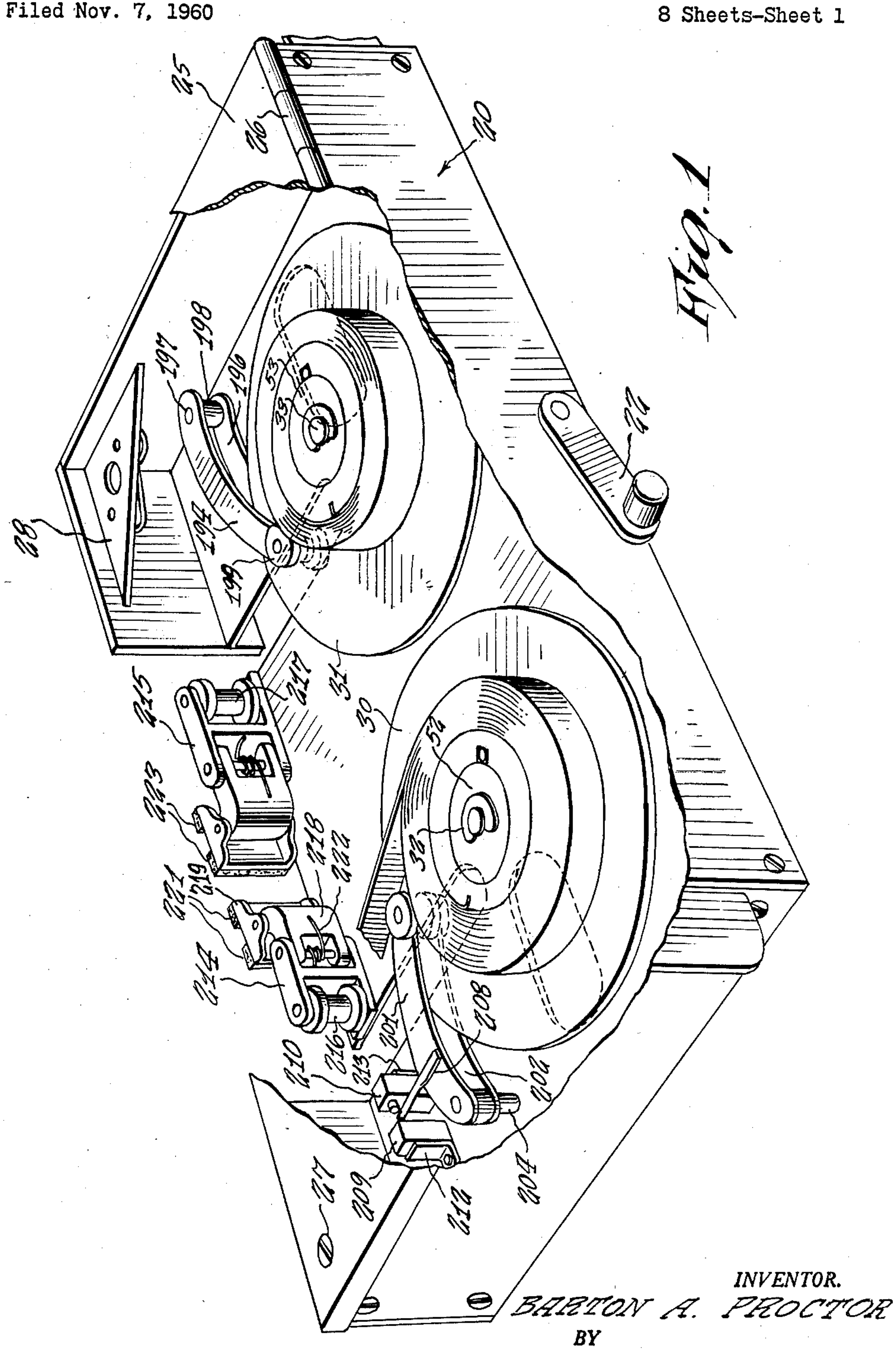
FIGURE 1 is a perspective view of a detachable magazine containing two reel turntable members upon which a strip of recording medium is disposed to be selectively wound and unwound, the magazine being partly broken away to illustrate details of construction.
Figure 2:
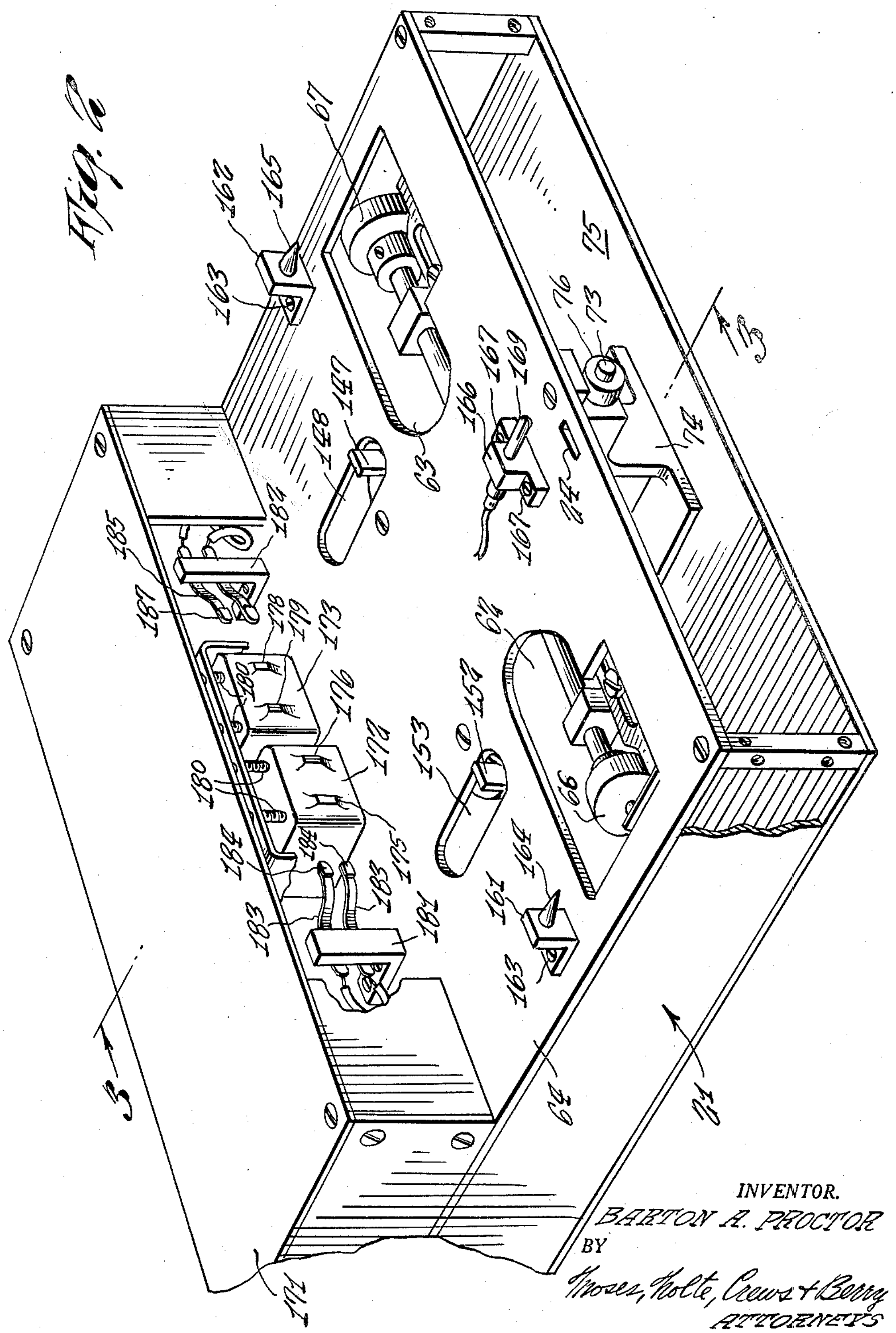
FIGURE 2 is a perspective view of the main portion of the recording device with which the magazine of FIG. 1 is used, the recording device being shown with the magazine removed and partly broken away to illustrate details of construction.

Referring to FIG. 1, there is shown a magazine designated generally as 20 which is adapted to be mounted on the recording apparatus designated generally as 21 and shown in FIG. 2. A locking handle 22 is provided at the front of the magazine 20. Rotation of handle 22 in a clockwise direction as viewed in FIG. 1 causes a locking tongue 23 (FIG. 10) to engage a slot 24 (FIG. 2) for locking the magazine 20 in operating position on the recording apparatus 21 as described in greater detail below.

The magazine 20 is provided with a cover 25 hinged thereto at 26. The magazine cover 25 is held closed by a pair of quick-acting fastening devices comprising a rotatable portion having a slotted head 27 and a cooperating pair of stationary portions 28 mounted in the rear corners of the magazine 20. Handles or ears 29 (FIG. 10) extend laterally from the front of the magazine 20 for facilitating handling.

Disposed within the magazine 20 are a pair of reel turntable members 30 and 31 freely rotatably mounted on fixed upright shafts 32 and 33, respectively. The reel turntable members are secured against upward movement by snap ring washers 36 and 37 (FIG. 4) fitted into grooves 36 and 37 formed in the upper end portions of upright shafts 32 and 33, sufficient clearance being provided to permit the reel turntable members 30 and 31 to rotate freely on their respective shafts 32 and 33. Anti-friction bushings 38 and 39 are provided at the centers of reel turntable members 30 and 31 for improving the smoothness of operation of the apparatus. Ball bearings or similar devices may be used, if desired.

Upright shafts 32 and 33 are provided with integrally formed enlarged base portions 40 and 41 which are secured to the floor 42 of magazine 20 by rivets 44. The shafts 32 and 33 are shouldered at their lower ends at 46 and 47, respectively, for engagement with the lower ends of anti-friction bushings 38 and 39. The under surfaces 48 and 49 of reel turntable members 30 and 31 are friction surfaces of frusto-conical configuration with an apex angle of slightly less than 180°.

Removably disposed on reel turntable members 30 and 31 are flangless spools 50 and 51 which are mounted on hub portions 52 and 53 of the turntable members. A strip of recording medium 55 is shown partially wound upon each spool, being distributed between the two spools 50 and 51. Fixed to each turntable member adjacent to the hub portions 52 and 53 are upright headed pins 56 and 57 which pass through vertical grooves 58 and 59 formed in the internal surfaces of the spools 50 and 51. Spring pressed ball detents 58 and 59 engage the constricted neck portions of headed pins 56 and 57, holding the spools 50 and 51 removably positioned on reel turntable members 30 and 31.

The floor 42 of magazine 20 is apertured at 60 below the frusto-conical friction surface 48 of reel turntable member 30 and at 61 below the corresponding surface 49 of reel turntable member 31. Apertures 62 and 63 are formed in the upper enclosing wall 64 of recording device 21 and are in register with apertures 60 and 61.

A pair of friction drive wheels 66 and 67 are fixed to opposite ends of a tiltable and revoluble shaft 68. Shaft 68 is journaled in bearing blocks 70 and 71 and is longitudinally slidable therein. Bearing blocks 70 and 71 are carried by a tilting frame member 72 which is supported intermediate its ends by a pivot pin 73 journaled in a supporting bracket 74 fixed to the floor 75 of recording device 21. Longitudinal movement of pivot pin 73 is prevented by a collar 76 which is secured thereto by a set screw 77. Shaft 68 is thus supported for pivotal movement about an axis which is perpendicular to its own axis.

Figure 4:
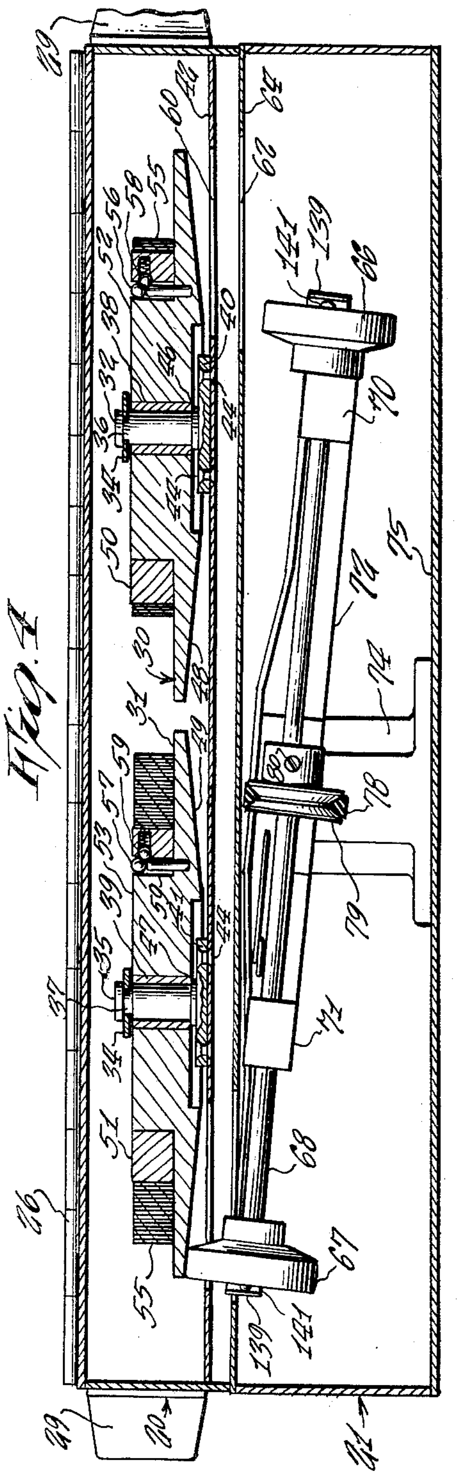
FIGURE 4 is a rear sectional view in elevation taken along the line 4—4 of FIG. 3, looking in the direction of the arrows.
Figure 3:
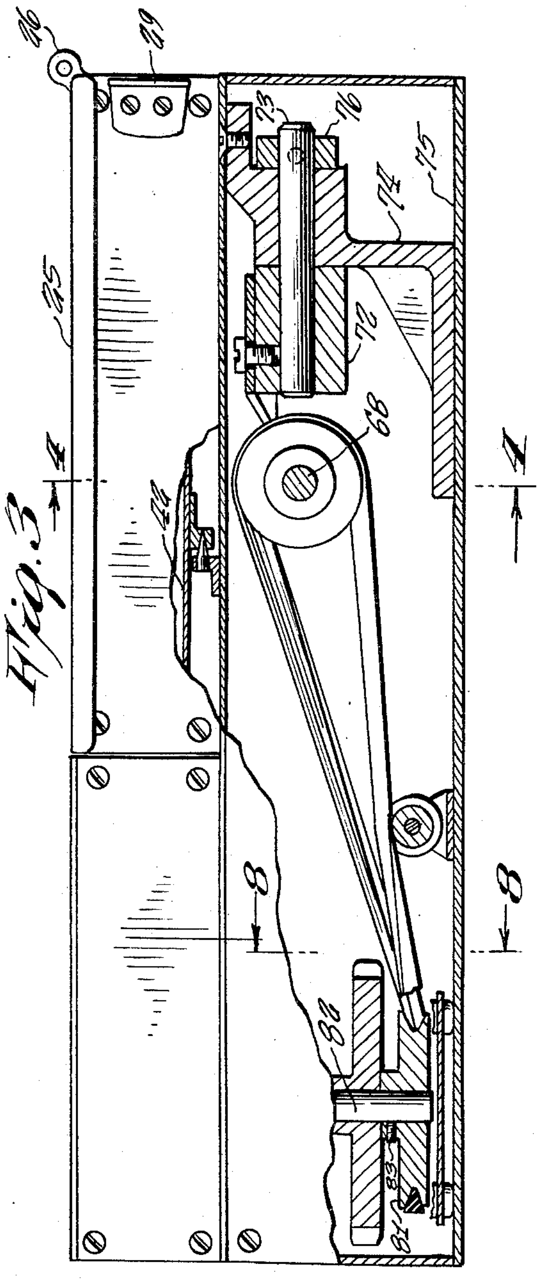
FIGURE 3 is a side view in elevation of the recording device of FIG. 2 with the magazine of FIG. 1 in position and with the walls of the magazine and recording device partly broken away to illustrate internal mechanism which is shown partially in section.

With tilting frame member 72 titled to one position, as shown in FIG. 4, the upper portion of friction drive wheel 67 extends through apertures 63 and 61 and enters into driving engagement with the under surface 49 of reel turntable member 31. Similarly, with the tilting frame member 72 tilted counter clockwise as viewed in FIG. 4 to its other position, the upper portion of friction drive wheel 66 drives reel turntable member 30. The tilting frame member 72 may also occupy a neutral position in which shaft 68 is substantially horizontal and both friction drive wheels 66 and 67 are disengaged from the under surfaces of the reel turntable members 30 and 31. Driving power is supplied by a V-belt 78 which passes around a grooved pulley 79 secured to shaft 72 by a set screw 80.

The V-belt 78 is driven by a grooved driving pulley 81 fixed to a vertical drive shaft 82 by a set screw 83. The V-belt 78 passes over an idler pulley 84 (FIG. 5) freely revolubly supported in a bracket 85 fixed to the floor 75 of recording device 21.

Figure 8:
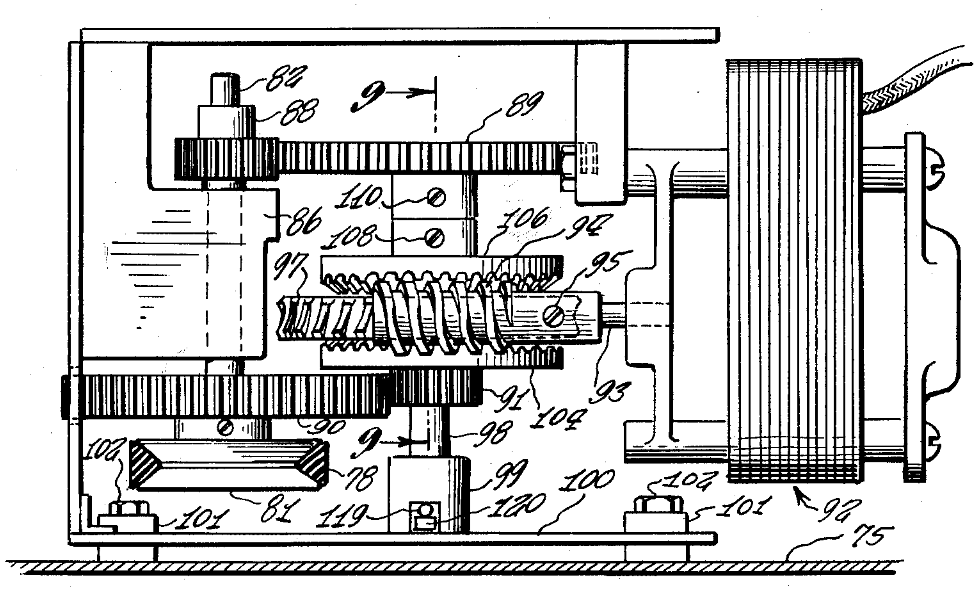
FIGURE 8 is an enlarged fragmentary elevational view illustrating a two-speed clutch mechanism.

As shown in FIG. 8, the output shaft 82 is journaled in a supporting block 86. A pinion 88 is fixed to the upper end of output shaft 82, and meshes with a high speed driving gear 89. A normal speed gear 90 is fixed to output shaft 82 near its lower end immediately above pulley 81, and gear 90 meshes with a normal speed drive pinion 91.

A direct current shunt motor or other constant speed motor designated generally as 92 is mounted in the recording device 21. The motor has a drive shaft 93. A worm 94 is fixed to motor shaft 93 by a set screw 95. Worm 94 meshes with a worm wheel 97 fixed to a hollow vertical input shaft 98 for rotation therewith. Input shaft 98 is journaled in a bifurcated pedestal 99 fixed to a supporting plate 100 which carries the motor 92 and its associated two-speed clutch mechanism. The supporting plate 100 is secured to the floor 75 of recording device 21 by vibration absorbing mountings 101 and cap screws 102. If desired, an upper bearing for input shaft 98 may be provided.

The normal speed drive pinion 91 is revolubly mounted on hollow input shaft 98 by a ball bearing 103. An upwardly facing bevel gear 104 is integrally formed with pinion 91 and rotates therewith on ball bearing 103, being disposed immediately below worm wheel 97. A downwardly facing bevel gear 106 is disposed immediately above worm wheel 97. Bevel gear 106 is fixed to a tubular sleeve 107 by a set screw 108. Sleeve 107 is freely revoluble on hollow shaft 98 and its lower end abuts against a circular flange 109 formed on shaft 98 preventing downward movement of sleeve 107. The high speed driving gear 89 is fixed to sleeve 107 by a set screw 110 to rotate with sleeve 107 and downwardly facing bevel gear 106.

A transverse slot 111 extends diametrically across worm wheel 97 and communicates with a diametrical through slot which is formed in the shaft 98 to provide a continuous passage from one side of worm wheel 97 to the other, the passage terminating interiorly of the periphery of the worm wheel at opposite sides thereof.

A T-shaped clutch member 113 is disposed in slot 111 and comprises a shank portion 115 which extends through slot 112 in shaft 98 and is pivoted to worm wheel 97 by a pin 116. The clutch member 113 comprises a head portion 117 which is selectively engageable with the teeth of either of the two axially aligned bevel gears 104 and 106. A helical compression spring 118 disposed in hollow shaft 98 presses downwardly on shank portion 115 of clutch member 113 normally urging the head portion 117 into driving engagement with the teeth of upwardly facing bevel gear 104. A vertically slidable push rod 119 is disposed within hollow shaft 98 and its rounded lower end rests on a clutch actuating lever 120 which extends into bifurcated pedestal 99 below the center of hollow shaft 98. The upper end of push rod 119 is located immediately below the shank portion 115 of T-shaped clutch member 113 in alignment with compression spring 118. Upward movement of push rod 119 will thus overcome the yielding pressure of spring 118 and urge the head portion 117 of clutch member 113 upwardly to disengage the upwardly facing teeth of normal speed bevel gear 104 and engage the downwardly facing teeth of high speed bevel gear 106. Vertical movement of push rod 119 is electromagnetically controlled as described in greater detail below.

Figure 5:
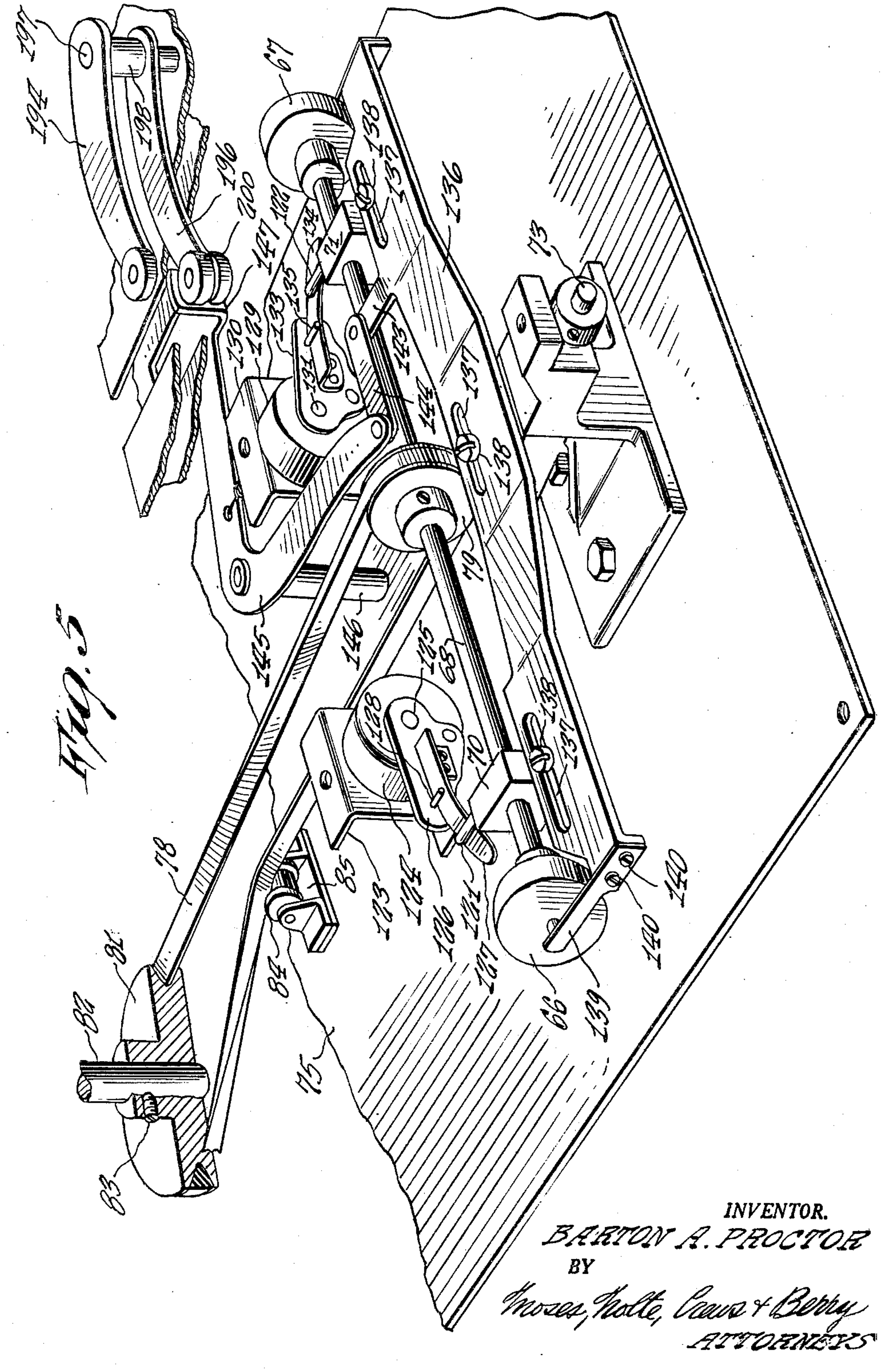
FIGURE 5 is a fragmentary perspective view of the main portion of the device with the magazine in place, illustrating portions of the constant speed drive mechanism.

Referring to FIG. 5, the bearing blocks 70 and 71 carry rearwardly directed pins 121 and 122, respectively. A bracket 123 supporting a rotary electromagnet or torque motor 124 is provided with an output shaft 125 to which an arm 126 is fixedly secured. Arm 126 carries a leaf spring 127 which is normally tensioned against a pin 128 fixed to the arm 126. Upon energization of rotary electromagnet 124, arm 126 rotates in a clockwise direction as viewed in FIG. 5 and leaf spring 127 presses upwardly against pin 121. This rotates the tilting frame 72 and shaft 68 in a clockwise direction as viewed in FIG. 5 and presses friction drive wheel 66 upwardly into driving engagement with the under surface 48 of reel turntable 30. The amount of rotation of arm 126 is sufficient to cause leaf spring 127 to disengage pin 128 on arm 126 and to apply its full upward pressure to pin 121. As a result of the pretensioning of leaf spring 127 against pin 128, the amount of upward pressure exerted by leaf spring 127 against pin 121 will be substantially constant notwithstanding small variations in the amount of angular displacement of arm 126 by rotary electromagnet 124.

At the right hand side of the recording device 21 as viewed in FIG. 5, there is provided a further rotary electromagnet or torque motor 129 which is supported by a bracket 130 similar to bracket 123. Rotary electromagnet 129 is provided with an output shaft 131 to which an arm 133 is fixed for rotation therewith. A leaf spring 134 is carried by arm 133 and is normally pretensioned against a stop pin 135 fixed to the arm 133. Upon energization of rotary electromagnet 129, arm 133 rotates in a counterclockwise direction as viewed in FIG. 5, and the free end portion of leaf spring 134 presses upwardly on the pin 122 carried by bearing block 71, thereby tilting shaft 68 about pivot pin 73 in a counterclockwise direction as viewed in FIG. 5. The angular displacement of arm 133 is sufficient to disengage leaf spring 134 from stop pin 135 and cause leaf spring 134 to apply its full tension for upward movement of pin 122, thereby pressing friction drive wheel 67 into driving engagement with the lower frusto-conical surface 49 of reel turntable 31.

With both rotary magnets 124 and 129 deenergized, the tilting frame member 72 assumes a neutral position in which shaft 78 is substantially horizontal and in which the friction drive wheels 66 and 67 are disengaged from the frusto-conical under surfaces 48 and 49 of reel turntable members 30 and 31. A weak biasing spring (not shown) may be provided to assist in this action, if desired.

The shaft 68 is axially displaceable in bearing blocks 70 and 71 and its axial position is controlled by a slidable positioning member 136 carried by tilting frame 72. The positioning member 136 is provided with elongated slots 137 through which pass shouldered screws 138 threaded into tilting frame 72. The shouldered screws 138 are slightly smaller in diameter than the width of slots 137 and they cannot be tightened sufficiently to bind positioning member 136 and interfere with its free sliding movement parallel to the longitudinal axis of shaft 68 on tilting frame 72.

Positioning member 136 carries two comparatively stiff leaf springs 139 disposed at opposite ends thereof and secured thereto by screws 140. The springs 139 act as thrust bearings and engage the rounded end portions 142 of shaft 68 thereby determining the longitudinal position of shaft 68 with respect to tilting frame 72. The positioning member 136 comprises a rearwardly extending arm portion 143. The arm portion 143 of positioning member 136 is connected by a link 144 to the end of one arm of a bell crank lever 145 pivotally supported on an upright post 146 fixed to the floor 75 of the recording device 21.

The other end of bell crank lever 145 terminates in an upwardly directed curved portion or tongue 147 which projects upwardly through an elongated aperture 148 (FIG. 2) formed in the upper enclosing wall 64 of recording device 21.

Figure 6:
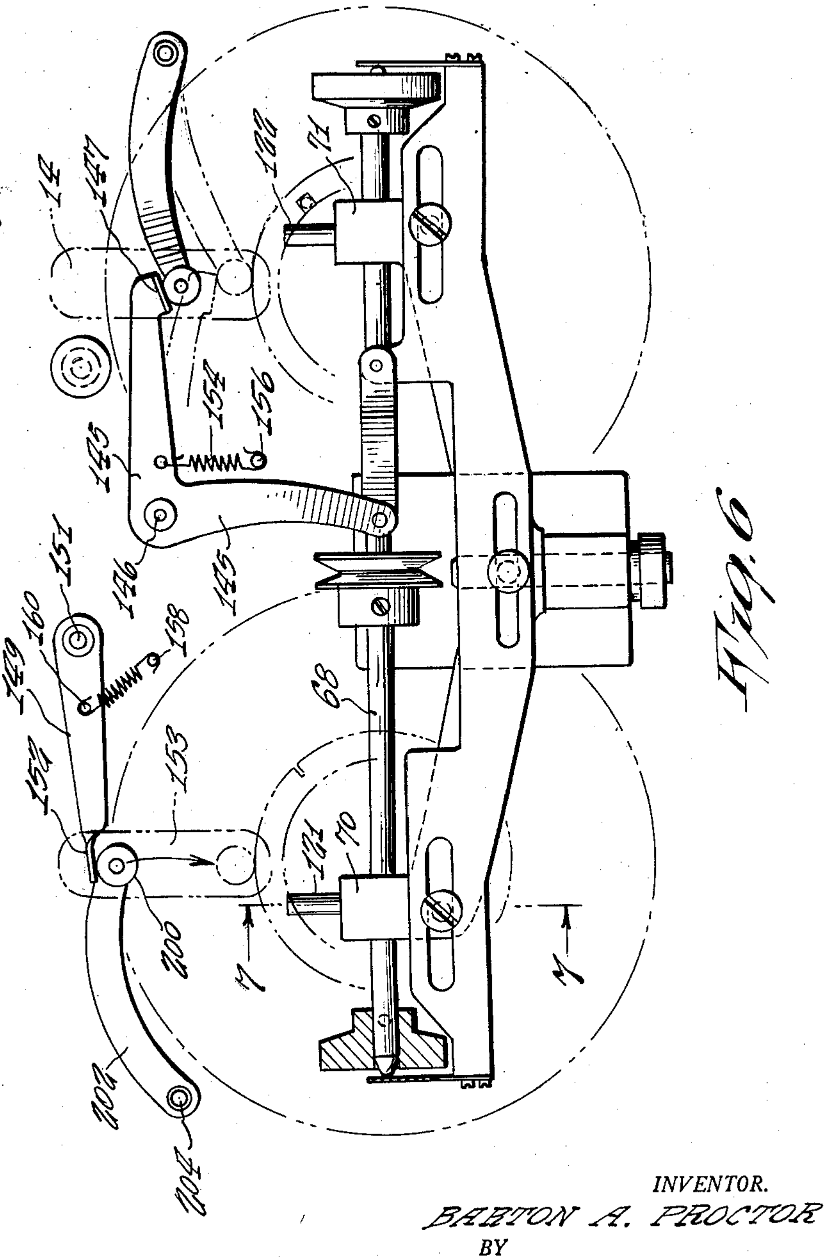
FIGURE 6 is a plan view, partly in section, showing portions of the constant speed drive mechanism.

At the left hand side of recording device 21, as viewed in FIG. 6, there is provided an arm 149 pivotally mounted on an upright supporting post 151 fixed to the floor 75 of recording device 21. The free end of the arm 149 terminates in an upwardly directed curved portion or tongue 152 which projects upwardly through an aperture 153 formed in the upper enclosing wall 64 of recording device 21. The tongues 147 and 153 are urged forwardly by helical tension springs 154 and 155, respectively. One end of tension spring 154 is connected to a fixed stud 156 and the other end is connected to a stud 157 carried by bell crank lever 145. One end of tension spring 154 is connected to a fixed stud 158 and the other end is connected to a stud 160 carried by arm 149.

Fixed to the upper surface of enclosing wall 64 are a pair of L-shaped brackets 161 and 162 secured thereto by screws 163. The brackets 161 and 162 carry forwardly directed conical members 164 and 165, respectively. Also disposed on the upper surface of enclosing wall 64 is a supporting member 166 secured thereto by screws 167. An electrical plug member 169 is mounted in supporting member 166 and is connected to an energizing conductor 170 which extends to a two-speed clutch control magnet described below.

Disposed in a rearwardly located enclosed portion of recording device 21 and covered by a top cover 171 are recording and reproducing heads 172 and 173 (FIG. 2). The recording and reproducing heads 172 and 173 are shown supported by a common inverted-U-shaped bracket 174. The recording and reproducing head 172 comprises an erasing pole member 175 and a recording and reproducing pole member 176. Similarly, the recording and reproducing head 173 comprises an erasing pole member 178 and a recording and reproducing pole member 179. The positions of recording and reproducing heads 172 and 173 are generally and individually adjustable in the inverted-U-shaped bracket 174 by means of a plurality of adjusting screws 180.

As shown in FIG. 2, the pole members 175 and 176 of recording and reproducing head 172 are aligned on a horizontal line which is parallel to and vertically displaced below the line of alignment of the pole members 178 and 179 of recording and reproducing head 173. This arrangement contemplates the use of only two vertically spaced recording areas on the recording medium 55. If desired, however, the recording heads may be arranged in horizontal alignment on a vertically displaceable recording head carriage 256 as shown in FIGS. 27 and 28 of my patented application, Serial No. 338,777, filed February 25, 1953. In such case, the appurtenant instrumentalities must be provided for coordinating the operation of the recording heads with their vertical position as more fully disclosed in my said patented application Serial No. 338,777.

Disposed on the upper surface of upper wall member 64 and beneath the top cover 171 are two L-shaped brackets 181 and 182. Bracket 181, on its upright leg, carries a pair of resilient mutually electrically insulated contact arms 183 which terminate in contact members 184 fixed thereto at their free ends. Similarly, bracket 182, on its upright leg, carries a pair of resilient mutually electrically insulated contact arms 185 which terminate in contact members 187 fixed thereto at their free ends.

Referring to the detachable magazine 20 (see FIG. 10), there are a pair of L-shaped brackets 188 and 189 fixed to the underside of magazine floor 42 and having conical apertures 190 and 191, respectively, formed therein. The apertures 190 and 191 are adapted to receive the rearwardly directed conical locking members 164 and 165 (FIG. 2), respectively, and when so received serve to fix the rear portion of magazine 20 to the recording device 21. A socket member 192, fixed to the under side of magazine floor 42 and electrically insulated therefrom, is provided with a circular aperture 193 adapted to receive plug member 169. When so received, the forward portion of magazine 20 is fixed to main portion of recording device 21. When locking tongue 23 is engaged in the slot 24, forward movement of magazine 20 is prevented and the magazine 20 is locked in operative engagement with the main portion of recording device 21. Additionally, an electrical circuit is completed which extends through plug member 169 and socket member 192 from the recording device 21 to the removable magazine 20, the return circuit being a chassis ground which is continuous when the magazine 20 is locked in operating position on the recording device 21. If desired, additional conductors may be provided which extend from the recording device 21 to the removable magazine 20 through plug and socket arrangements such as those illustrated in my said patented applications, Serial Nos.

338,777 and 421,839 referred to above. The purpose of this particular circuit is to assure slow speed operation of the recording device immediately prior to reversal of the direction of travel of the recording medium when the recording medium would otherwise be moving at high speed. This is described in great detail below.

Referring in greater detail to the removable magazine 20 (FIG. 1) a double arm 194–196 is shown pivotally supported on an upright post 197, the two arms 194 and 196 both being fixed to a hollow sleeve member 198 which serves as a common bearing and which interconnects the two arms 194–196. A feeler roller 199 is freely revolubly carried by upper arm 194 adjacent to its free end.

The roller 194 is normally yieldingly pressed into engagement with the outermost layer of the recording medium 55 wound on the hub 53 of right hand reel turntable 31 and will vary its position in accordance with the amount of recording medium wound thereon.

Figure 7:
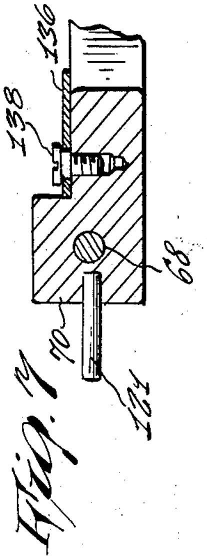
FIGURE 7 is a sectional view in elevation taken along the line 7—7 of FIG. 6, looking in the direction of the arrows.

The lower arm 196 carries a freely revoluble double roller 200 (FIG. 5) adjacent to its free end. When the magazine 20 is locked in operating position on the recording device 21, the double roller 200 is engaged by the upwardly extending tongue 147 of bell crank lever 145. The helical tension spring 154 (FIG. 7) causes the tongue 147 to urge the double lever 194—196 in a counterclockwise direction as viewed in FIG. 1 and thus press the roller 199 yieldingly against the outermost layer of the recording medium 55 wound on the right hand reel turntable 31. The amount of recording medium 55 wound on reel turntable 31 thus determines the position of bell crank lever 145 and hence the axial position of shaft 68.

The various elements are so proportioned that friction drive wheel 67 is positioned directly beneath the outermost layer of recording medium 55 wound on flangeless spool 51 carried by reel turntable 31. The axial spacing between friction drive wheels 66 and 67 is such that the friction drive wheel 66 will be positioned substantially directly beneath the outermost layer of recording medium 55 wound on the flangeless spool 52 of reel turntable 30. The shaft 68 is driven at substantially constant speed. Accordingly, the recording medium 55 will be driven at substantially constant linear speed, regardless of which of the two reel turntables 30 or 31 is being driven, this constant speed drive being effected by driving engagement between the friction drive wheel 66 and the friction surface 49 of reel turntable member 31, or by driving engagement between friction drive wheel 66 and the friction surface 48 of reel turntable member 30, depending upon the position of tilting frame member 72, the direction of travel of the recording medium 55 being determined by the position of tilting frame member 72.

As described above, the axial spacing on shaft 68 between the friction drive wheels 66 and 67 is such that when either turntable member 30 or 31 is substantially either fully wound or fully unwound, the drive wheels 66 and 67 will be positioned directly beneath the outermost layers of recording medium on both reel turntable members 30 and 31.

When, however, the axial position of shaft 68 is being controlled by the amount of recording medium remaining unwound from reel turntable member 31 during driving of reel turntable member 30 and the accompanying winding of recording medium 55 thereon, then there will be an initial period during which the speed of travel of the recording medium 55 is slower than the average normal speed and a final period during which it is higher than normal, the correct normal speed being obtained at the beginning, the middle and at the end of the winding operation of reel turntable member 30.

The difference between the empty and full radii of the reel turntable members 30 and 31 is sufficiently small so that the effect of this relatively small range of speed change will not be noticeable insofar as the general speed of travel of the recording medium is concerned. As between recording and reproducing operation, however, this small error duplicates itself exactly so that no change in frequency between recorded and reproduced signals will be introduced. The speed of the recording medium is sufficiently constant so that factors which depend upon the general speed of travel, such as noise, frequency range of the recorded signals and similar characteristics will remain effectively undisturbed. This would not be the case if the reel turntable members 30 and 31 were driven at constant angular velocity. The speed of travel of the recording medium under such conditions would be proportional to the radius of the outermost layer of recording medium already wound at any particular instant on the driven reel turntable member upon which the recording medium is then in the process of being wound. With a substantial variation in diameter, a generally constant travel speed for the recording medium cannot be maintained using a constant angular velocity for the winding reel.

Disposed at the left of magazine 20 is a double arm 201—202 which is pivotally supported on an upright post 204, the two arms 201 and 202 both being fixed to a hollow sleeve member 205 which serves as a common bearing and which interconnects the two arms 201—202. A roller 206 is freely revolubly carried by the upper arm 201 adjacent to its free end.

As described below, the upper roller 206 is normally yieldingly pressed into engagement with the outermost layer of recording medium 55 wound on the hub 52 of left hand reel turntable member 30 and will vary its position in accordance with the amount of recording medium wound thereon.

The lower arm 202 carries a freely revoluble double roller 207 (FIG. 7) similar to the double roller 200 carried by the right hand lower arm 196. With the magazine 20 in place on recording device 21, the double roller 207 engages the upwardly directed curved tongue portion 152 of arm 149. The tension spring 155 causes the tongue 152 to press against roller 207 and urge the upper roller 206 into yielding engagement with the outermost layer of recording medium wound on the left hand reel turntable member 30. The spring pressed upper rollers 199 and 206 exert a certain amount of frictional braking action during the unwinding operation of reel turntable members 31 and 30, respectively, this braking action being sufficient to prevent overtravel caused by inertia during starting and stopping of the recording apparatus. If desired, electromagnetically controlled friction drag means may be utilized as described in my said patented application, Serial No. 338,777, and illustrated in FIGS. 10, 13, 14 and 22 of the drawing thereof.

The upper left arm 201 (FIG. 1) carries a rearwardly extending switch actuating arm 208. When reel turntable member 30 is nearly full, the switch actuating arm 208 actuates a normally closed switch 209 for preventing high speed travel of the recording medium at the time when the direction of travel of the recording medium 55 is reversed. Similarly, when the reel turntable member 30 is nearly empty, a similar switch 210 is actuated, which likewise prevents high speed travel of the recording medium at the time of reversal of its direction of travel. The switches 209 and 210 are supported by L-shaped brackets 212 and 213, respectively, which are adjustably secured to the upper side of the magazine floor 42. By suitable adjustment of the positions of supporting brackets 212 and 213, the point of actuation of switches 209 and 210 may be correspondingly adjusted so that the recording medium 55 will always be driven at normal speed whenever the reel turntable member 30 is nearly empty or nearly full.

Mounted on the upper surface of magazine floor 42 are a pair of H-shaped brackets 214 and 215 at the left and right rear portions of the magazine 20. Freely revolubly supported at the left side of H-shaped bracket 214 is flanged roller 216 which guides the recording medium 55. A similar flanged guide roller 217 is revolubly supported at the right side of the L-shaped bracket 215.

A bifurcated arm 218 is pivotally secured to the right side of H-shaped bracket 214. A pressure pad support 219 is pivotally mounted at the free end of bifurcated arm 218. Horizontally spaced pressure pads 221 are fixed to the pressure pad support 219 and are disposed for engagement with the recording medium 55 for pressing the recording medium into engagement with pole members 175 and 176 of the left hand recording and reproducing head 172. The required pressure is supplied by the yielding action of a helical torsion spring 222 disposed between the vertical spaced legs of bifurcated arm 218.

Similarly, pressure pads 223 yieldingly press the recording medium 55 into operative engagement with the pole members 178 and 179 of the right recording and reproducing head 173.

Figure 13:
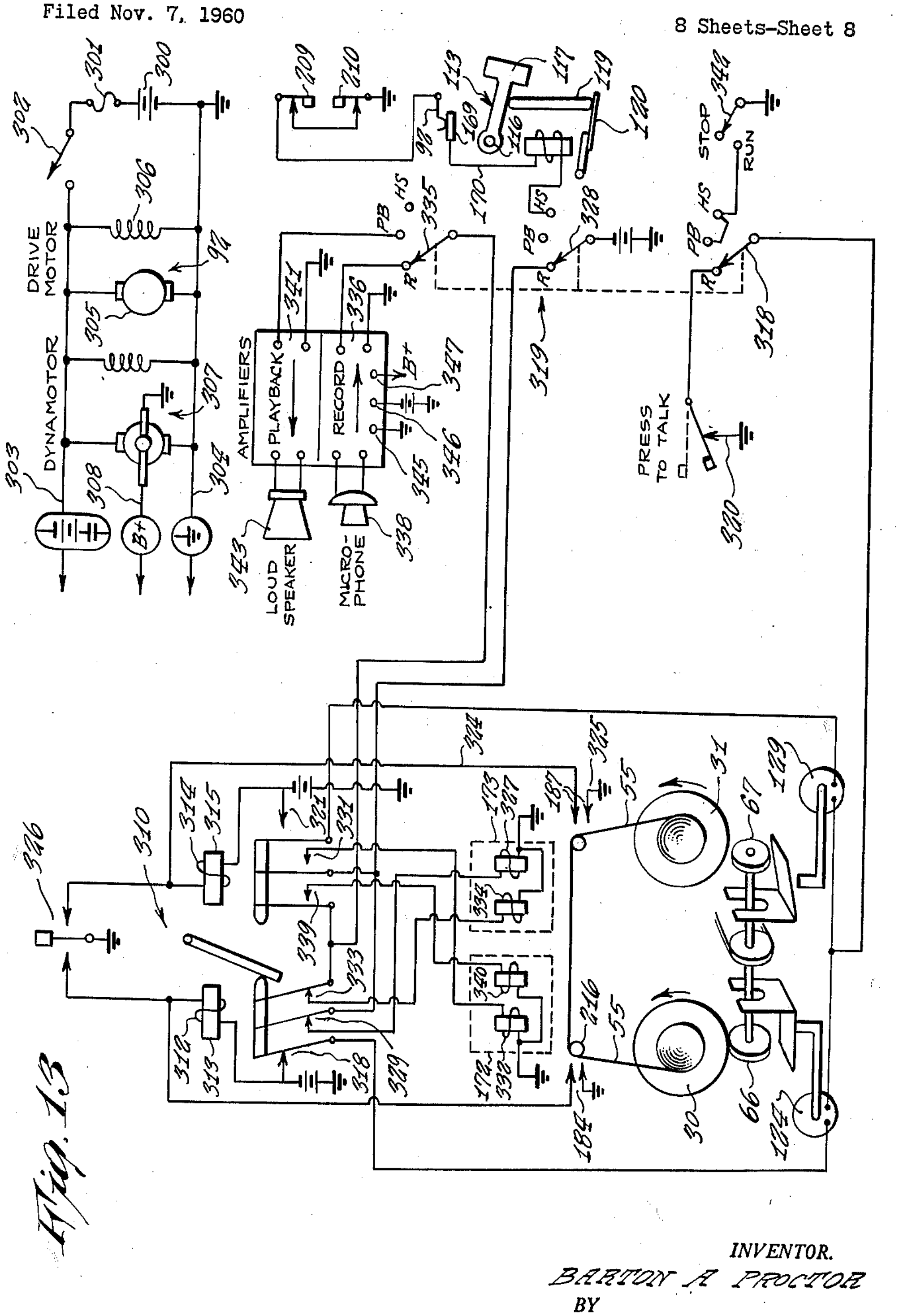
FIGURE 13 is an electrical circuit diagram of a complete apparatus in accordance with the invention.

Referring to the circuit diagram shown in FIG. 13, the apparatus is energized from a direct current source illustratively shown as a grounded battery 300. The battery is protected by a fuse 301 which is connected to a main power switch 302. From the main power switch 302, the ungrounded side of battery 300 extends through a distribution conductor 303 to other points indicated in the drawing by the conventional symbol for a grounded battery. Similarly, the grounded side of the battery 300 extends through a distribution conductor 304 to other points indicated in the drawing by the conventional symbol for ground. The constant speed drive motor 92 is energized whenever the main power switch 302 is closed. The drive motor 92 is indicated as comprising an armature 305 and a shunt field 306. Conventional control means (not shown) may be provided for maintaining the speed of armature 305 at a precisely constant value.

A dynamotor 307 which is energized whenever main power switch 302 is closed, produces a high voltage direct current output and serves as an anode supply for the tubes of certain amplifiers described below. The anode voltage is carried by a distribution conductor 308 to other points in the drawing indicated by the symbol B+.

A flip-flop relay of conventional construction designated generally as 310 controls the direction of travel of recording medium 55 and coordinates the operation of the recording and reproducing heads 172 and 173 accordingly. The flip-flop relay 310 comprises an armature 311 which has no neutral position. The armature 311 may be drawn to the left by energizing the operating winding 312 of an electromagnet 313 and will remain operated in this position after winding 312 is de-energized. Similarly, the armature 311 may be drawn to the right by energization of the operating winding 314 of another electromagnet 315. If desired, a latching relay or two relays with interlocking armatures may be used.

In FIG. 13, the recording medium 55 is shown being wound on reel turntable member 30 and is traveling from right to left past the recording and reproducing heads 173 and 172 in the order named in the direction indicated by the arrow 317. Battery is supplied through a pair of contacts 318 of flip-flop relay 310 to the rotary electromagnet 124 which presses the friction drive wheel 66 into engagement with reel turntable member 30 to cause the recording medium to be wound thereon.

The circuit to ground is completed from rotary electromagnet 124 through the lowermost pole 318 of a three-pole three-position switch 319 and a press-to-talk switch 320 which is shown with its contacts closed. When the press-to-talk switch 320 is released, rotary electromagnet 124 is de-energized and the tilting frame member 72 assumes its neutral position thereby withdrawing friction drive wheel 66 from driving engagement with reel turntable member 30. The recording medium 55 immediately stops.

With armature 311 actuated to the right, contacts 321 at the right of flip-flop relay 310 close and contacts 318 open. This disconnects rotary electromagnet 124 and connects rotary electromagnet 129 for operation under control of press-to-talk switch 320. Energization of rotary electromagnet 129 will press friction drive wheel 67 into engagement with reel turntable member 31 and cause the recording medium 55 to wind thereon, thereby reversing the direction of travel of recording medium 55 so that it will move in the direction opposite to that indicated by the arrow 317.

Figures 10, 11, 12:
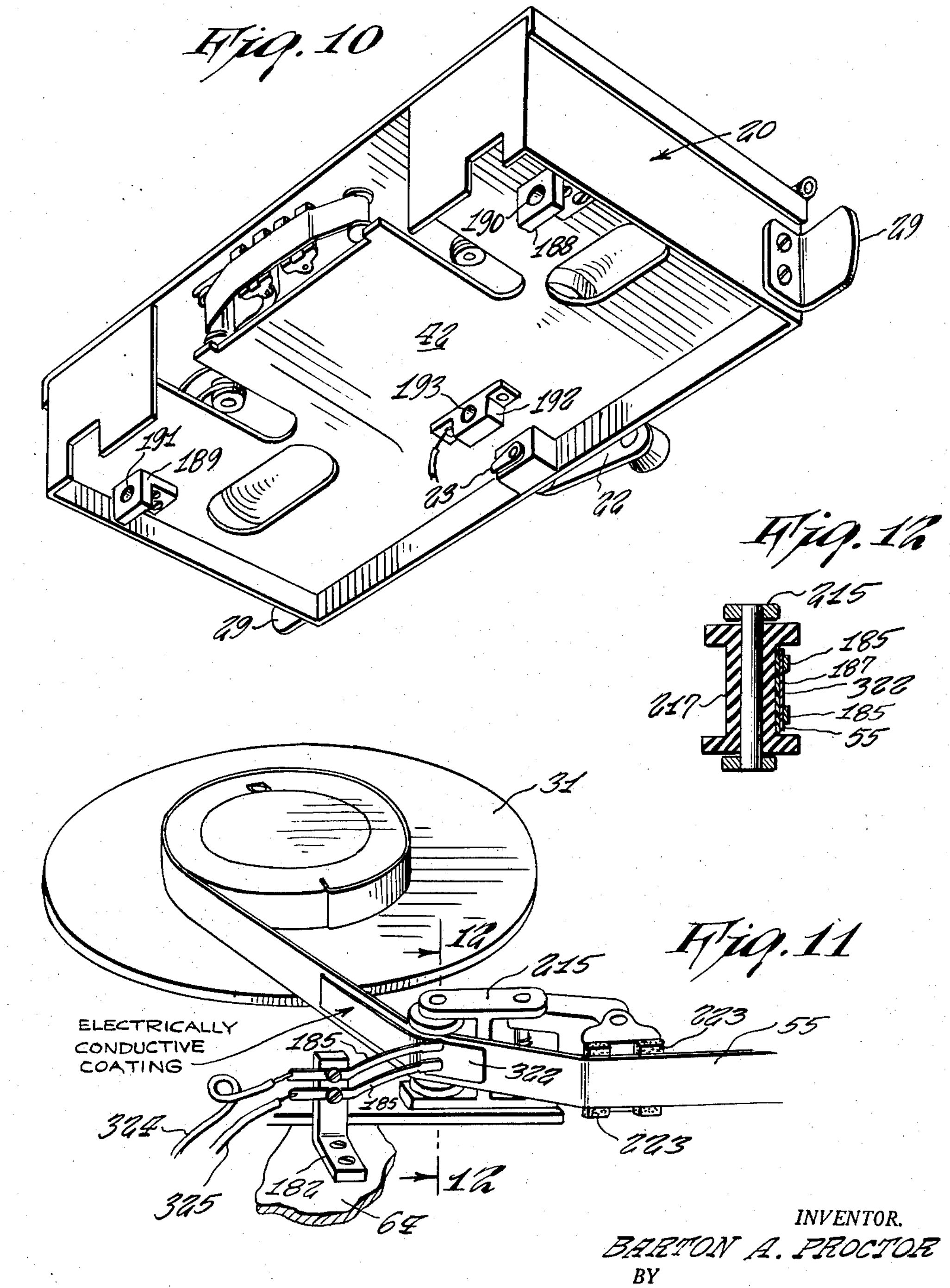
FIGURE 10 is a bottom perspective view of the magazine shown in FIG. 1.
FIGURE 11 is a fragmentary perspective view showing an electrically conductive area on a strip of recording medium for the control of mechanism which reverses the direction of travel of the recording medium.
FIGURE 12 is an enlarged sectional view in elevation taken along the line 12—12 of FIG. 11, looking in the direction of the arrows.

Near each end, the recording medium 55 is provided with an electrically conductive coating 322 (FIGS. 11 and 12). The contacts 187 carried by resilient contact arms 185 are in engagement with the electrically conductive area 322, thereby completing a normally open circuit through conductors 324 and 325 just as the recording medium 55 is nearly unwound from reel turntable member 31. Referring back to FIG. 13 it will be seen that conductor 325 is grounded and that conductor 326 extends to the right hand operating winding 314 of flip-flop relay 310. This draws the armature 311 to the right opening contacts 318 and de-energizing rotary magnet 124, at the same time closing contacts 321 and energizing rotary magnet 129. The reel turntable member 31 then begins to wind the recording medium 55 and when reel turntable member 30 is nearly empty, a further electrically conductive coating (not shown) similar to the electrically conductive coating 322 but disposed near the opposite end of the strip of recording medium 55, engages contacts 184 on resilient arms 183 supported by bracket 181. This energizes the left hand winding 312 of flip-flop relay 310 and draws armature 311 to the left, causing the recording medium 55 to be wound again on reel turntable member 30.

The direction of travel of recording medium 55 is thus automatically reversed as soon as it is nearly completely unwound from either of the reel turntable members 30 or 31. The direction of travel of the recording medium may be reversed at will by means of a manually operable self restoring single pole double throw switch 326 which normally assumes a neutral position. When switch 326 is operated to the left, armature 311 is drawn to the left and the recording medium travels in the direction indicated by arrow 317. When switch 326 is operated to the right, armature 311 is drawn to the right and the direction of travel of the recording medium 55 is reversed.

The recording heads 172 and 173 are arranged to operate independently on two separate vertically spaced recording areas on recording medium 55. Accordingly, one head or the other must be selected for use depending upon the direction of travel of the recording medium 55.

With the recording medium 55 moving as indicated by the arrow 317 erasing winding 327 of head 173 is energized and activates pole member 175 for obliterating any previous recording before a new recording is impressed. Battery is supplied through the middle pole 328 of three-position switch 319 and contacts 329 of relay 310 to the erasing winding 327. With relay armature 311 actuated to the right and the direction of travel of recording medium 55 reversed, contacts 331 of relay 310 will close energizing the erasing winding 332 of recording head 172 and activating pole members 178.

With relay 311 in the position shown, contacts 333 are closed and the recording and reproducing winding 334 associated with pole member 179 of recording head 173 is connected through the uppermost pole 335 of three-position switch 319 to the output of a recording amplifier. The input to recording amplifier 336 is illustratively shown as being derived from a microphone 338, but any suitable source of signals may be used as desired. When the direction of travel of recording medium 55 is reversed, contacts 333 of relay 310 open and contacts 339 close. This disconnects the recording and reproducing winding 334 of recording head 173 and connects the recording and reproducing winding 340 associated with pole member 176 of recording head 172 for operation with its erasing winding 332 also being connected for activation of pole member 175 as described above.

The three-pole switch 319 has three positions designed "Record," "Playback" and "High Speed." In FIG. 13, the switch 319 is shown in its "Record" position.

When operated to the right to its "Playback" position, the uppermost pole 335 of switch 319 disconnects the recording amplifier 336 and connects whichever of the recording and reproducing windings 334 or 340 may be selected by relay 310 to the input of a playback amplifier 341. The middle pole 328 disconnects battery from the erasing windings. The bottom pole 318 transfers control of the tape drive from the press-to-talk switch 320 to a single-pole single-throw start-stop switch 342. A loudspeaker 343 is shown connected to the output of playback amplifier 341 for listening to the recorded signals as they are played back. A volume control (not shown) may be provided if desired.

The two amplifiers are shown supplied with power applied to common power supply terminals 345, 346 and 347 which are connected respectively to ground, battery through power switch 302, and the annode supply B+ from dynamotor 307. If desired, the three-position switch 319 may be modified to deenergize or otherwise shut off either or both of the amplifiers 336 or 341 when such amplifier is not in actual use, since only one amplifier is used at a time.

Figure 9:
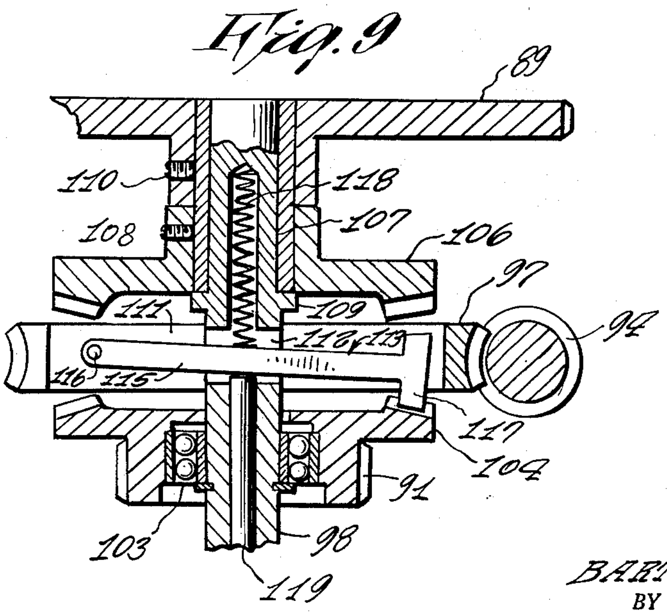
FIGURE 9 is an enlarged fragmentary sectional view in elevation illustrating details of construction of the two-speed clutch mechanism shown in FIG. 8.

When operated to its "High Speed" position, the uppermost pole of switch 319 disconnects both amplifiers from the recording heads 172 and 173. The middle pole 319 maintains control of the tape drive continued by stop-run switch 342. The middle pole energizes a high speed clutch magnet 348. The armature of magnet 348 lifts clutch actuating lever 120 (see FIGS. 8 and 9) raising push rod 119 and raising the head portion 117 of T-shaped clutch member 113. This causes the recording medium to travel at high speed for rapidly selecting a particular longitudinal portion thereof. The longitudinal position may be indicated by indicating means of any desired type, one such arrangement being shown in my patented application Serial No. 421,839 referred to above.

As the recording medium while traveling at high speed becomes nearly unwound from either reel turntable member one of the normally closed switches 209 or 210 will open and de-energize clutch magnet 348 causing the speed of driving the recording medium to the reduced to normal. This occurs just before flip-flop relay 310 is actuated to reverse the direction of travel of the recording medium. The mechanism for actuating these switches is described above and assures that reversal of the direction of travel of the recording medium will not take place during high speed operation.

I have described what I believe to be the best embodiments of my invention. I do not wish, however, to be confined to the embodiments shown, but what I desire to cover by Letters Patent is set forth in the appended claims.

What is claimed is:

1. A device of the class described comprising two rotatable turntable means, a recording medium in strip form wound on both of said turntable means, means for propelling said medium at a constant linear velocity between said turntable means, including a driven rotary shaft pivotally tiltable about an axis extending transversely of its rotational axis, friction drive means carried by said shaft tiltable to engage a selected one of said turntable means to supply a single variable driving force to said medium, and selectively operable means for causing said pivotal tilting movement whereby said strip of recording medium will be wound upon one or the other of said turntable means as determined by the operation of said selectively operable means.

2. A device according to claim 1 in which said shaft has a neutral position of pivotal movement in which said friction drive means engage neither of said turntable means, further comprising control means actuable by a predetermined longitudinal portion of said recording medium, said control means determining a single direction of pivotal tilting movement of said shaft from said neutral position by said selectively operable means, whereby said recording medium will be wound upon a particular one of said two turntable means determined by said control means.

3. A device of the class described, comprising: two rotatable turntable means; a recording medium in strip form disposed on both of said turntable means and adapted to be selectively wound on either of said turntable means and unwound from the other of said turntable means; an axially displaceable rotary shaft driven at substantially constant speed and pivotally supported for movement about an axis extending transversely of its rotational axis; two axially spaced friction drive wheel means carried by said shaft, each disposed to be pressed into individual driving engagement with one of said turntable means in response to pivotal movement of said shaft; selectively operable means for causing said pivotal movement and pressing a particular one of said drive wheel means into said driving engagement; means progressively controlled by amount of said recording medium wound upon one of said turntable means; and connecting means engaging said shaft for determining the axial position thereof, said connecting means being actuated by said progressively controlled means to displace said shaft axially and move both of said drive wheel means, each for engagement with a portion of one of said turntable means of which the distance from the axis of rotation of said turntable means varies progressively for maintaining the linear speed of said recording medium within a relatively narrow range during the winding thereof upon either of said turntable means.

4. A device according to claim 3, in which said shaft has a neutral position of pivotal movement in which neither of said drive wheel means engages either of said turntable means, said selectively operable means being controllable to produce pivotal movement of said shaft in either direction from said neutral position for starting and stopping the winding of said recording medium upon either of said two turntable means.

5. A device according to claim 3, wherein the axes of rotation of said turntable means are parallel, said device further comprising a tiltable frame member which rotatably and axially displaceably supports said shaft for pivotal movement, the axis of said pivotal movement being substantially normal to the plane of said parallel axes and equidistant therefrom, and in which each of said turntable means comprises a right circular frusto-conical friction surface for engagement by said drive wheel means, each friction surface being coaxial with the rotational axis of the turntable means, the conical apex angles of said frusto-conical surfaces being equal, the diameters of said drive wheel means being substantially equal and said pivotal axis being positioned with respect to said friction surfaces to maintain the longitudinal axis of said shaft substantially parallel to a generating line of one of said friction surfaces during axial displacement of said shaft with either of drive wheel means in engagement with one of said friction surfaces.

6. A device according to claim 5, in which said tiltable frame member has a neutral position in which neither of said drive wheel means engages either of said friction surfaces and in which said selectively operable means comprises a pair of electromagnet means connected to tilt said frame member from said neutral position, in opposite directions, whereby energization of one of said electromagnet means causes a particular one of said drive wheel means to be pressed into engagement with one of said friction surfaces.

7. A device according to claim 6, further comprising resilient means interposed between said electromagnet means and said frame member.

8. A device according to claim 7, in which said resilient means permits said frame member to assume said neutral position.

9. A device according to claim 3, in which said shaft has a neutral position of pivotal movement in which neither of said drive wheel means engages either of said turntable means, said device further comprising resilient means yieldingly urging said shaft toward said neutral position.

10. An apparatus of the class described, comprising: a main portion; a closed magazine portion having a plurality of openings formed therein, said magazine portion being removably engaged with said main portion; a pair of turntable means disposed in said magazine portion, each turntable means being individually accessible through one of said openings; a recording medium in strip form disposed on said turntable means to be selectively wound on one of said turntable means and unwound from the other turntable means, said recording medium comprising a portion extending intermediate said turntable means in proximity to another one of said openings; means for driving said recording medium in the proximity of said openings at a constant linear velocity including power operated driving means disposed in said main portion and comprising a rotary shaft pivoted for movement about an axis extending transversely of its rotational axis; two friction drive wheel means each disposed to enter said magazine through one of said openings and to be pressed into driving engagement with one of said turntable means by selective pivotal movement of said shaft; selectively operable means for causing said pivotal movement and thereby causing said strip of recording medium to be wound upon one or the other of said turntable means as determined by the operation of said selectively operable means; and recording and reproducing means disposed in said main portion and operatively engaging said recording medium through said other of said openings.

11. A device according to claim 10, further comprising a tiltable frame member which rotatably supports said shaft for pivotal movement, and resilient means interposed between said selectively operable means and said tiltable frame member for yieldingly pressing either of said two friction drive wheel means into engagement with its corresponding turntable means.

12. For use with an apparatus of the class described, said apparatus including a main portion to which said magazine is detachably securable, said main portion comprising recording and reproducing means; an axially displaceable rotary shaft power driven at substantially constant speed and pivotally supported for movement about an axis extending transversely of its rotational axis; two axially spaced friction drive wheel means carried by said shaft; selectively operable means for causing said pivotal movement in either direction; and displacement means for varying the axial position of said shaft; a detachable magazine comprising: an enclosure having a plurality of apertures formed therein; a pair of rotatable turntable members disposed within said enclosure, each turntable member, with said magazine in place, being individually selectively accessible through one of said apertures by one of said drive wheel means for driving engagement therewith, said driving engagement being producible by said selectively operable means; a recording medium in strip form disposed on said turntable members and disposed to be selectively wound on one of said turntable members and unwound from the other, said recording medium comprising a portion extending intermediate said turntable members and in proximity to another of said apertures for operative engagement with said recording and reproducing means through said other aperture with said magazine in place; and feeler means engaging said displacement means with said magazine in place, said feeler means being progressively controlled by engagement with the outermost layer of said recording medium wound on one of said turntable members for determining the axial position of said shaft and moving both of said drive wheel means, each for engagement with a portion of one of said turntable members of which the distance from the axis of rotation of said turntable member varies progressively for maintaining the linear speed of said recording medium as it passes said recording and reproducing means within a relatively narrow range during the winding of said recording medium upon either of said turntable members.

13. A device of the class described comprising two rotatable turntable means, a recording medium in strip form wound on both of said turntable means, means for propelling said medium at a constant linear velocity between said turntable means, including a driven rotary shaft pivoted for movement about an axis extending transversely of its rotational axis, means carried by said shaft for supplying the only driving force to said medium by said means selectively engaging one of said turntable means, and selectively operable means for causing said pivotal movement whereby said strip of recording medium will be wound upon one or the other of said turntable means as determined by the operation of said selectively operable means.

References Cited in the file of this patent

UNITED STATES PATENTS

| | | |
|---|---|---|
| 2,320,713 | Brotman | June 1, 1943 |
| 2,609,998 | Sear | Sept. 9, 1952 |
| 2,668,059 | Roberts | Feb. 2, 1954 |
| 2,673,041 | Hittle | Mar 23, 1954 |
| 2,675,973 | Reed et al. | Apr. 20, 1954 |
| 2,676,494 | Olson | Apr. 27, 1954 |
| 2,706,638 | Bruderlin et al. | Apr. 19, 1955 |